United States Patent
Fujita et al.

(10) Patent No.: US 10,544,333 B2
(45) Date of Patent: Jan. 28, 2020

(54) ADHESIVE RESIN LAYER AND ADHESIVE RESIN FILM

(71) Applicant: FUJIMORI KOGYO CO., LTD., Tokyo (JP)

(72) Inventors: Shiro Fujita, Tokyo (JP); Atsushi Suzuki, Tokyo (JP); Hiroto Niimi, Tokyo (JP)

(73) Assignee: FUJIMORI KOGYO CO., LTD., Tokyo (JP)

( * ) Notice: Subject to any disclaimer, the term of this patent is extended or adjusted under 35 U.S.C. 154(b) by 148 days.

(21) Appl. No.: 15/549,864

(22) PCT Filed: Feb. 29, 2016

(86) PCT No.: PCT/IB2016/000188
§ 371 (c)(1),
(2) Date: Aug. 9, 2017

(87) PCT Pub. No.: WO2017/013479
PCT Pub. Date: Jan. 26, 2017

(65) Prior Publication Data
US 2018/0044552 A1    Feb. 15, 2018

(30) Foreign Application Priority Data
Jul. 17, 2015    (JP) ................ 2015-142880

(51) Int. Cl.
A61H 7/00    (2006.01)
A61H 1/00    (2006.01)
C09J 4/06    (2006.01)

(52) U.S. Cl.
CPC ........... *C09J 4/06* (2013.01); *C09J 2201/606* (2013.01); *C09J 2433/00* (2013.01)

(58) Field of Classification Search
None
See application file for complete search history.

(56) References Cited

U.S. PATENT DOCUMENTS

| | | | |
|---|---|---|---|
| 2010/0120931 A1 | 5/2010 | Zajaczkowski et al. | |
| 2010/0159234 A1 | 6/2010 | Bae et al. | |
| 2011/0109848 A1* | 5/2011 | Yoon .................... | C09J 133/066 349/96 |
| 2011/0205469 A1 | 8/2011 | Ha et al. | |
| 2017/0368808 A1 | 12/2017 | Fujita et al. | |
| 2018/0022971 A1 | 1/2018 | Fujita et al. | |

FOREIGN PATENT DOCUMENTS

| | | |
|---|---|---|
| CN | 101210095 A | 7/2008 |
| CN | 102015950 A | 4/2011 |
| EP | 3239259 A1 | 11/2017 |
| JP | H0776672 A | 3/1995 |
| JP | 3764133 B2 | 4/2006 |
| JP | 3803200 B2 | 8/2006 |
| JP | 2011509332 A | 3/2011 |
| JP | 2011162659 A | 8/2011 |
| JP | 2012193321 A | 10/2012 |
| JP | 2013234322 A | 11/2013 |
| JP | 2014024899 A | 2/2014 |
| JP | 6460525 B2 | 1/2019 |
| JP | 6583991 B2 | 10/2019 |
| KR | 10-2010-0073848 A | 7/2010 |
| KR | 1020130056832 A | 5/2013 |
| WO | 2008116033 A2 | 9/2008 |
| WO | 2015152010 A1 | 10/2015 |

OTHER PUBLICATIONS

International Preliminary Report on Patentability dated Jan. 23, 2018 for PCT/IB2016/000188 and English translation thereof, 13 pgs.
Office Action for Korean Patent Application No. 10-2017-7022139 dated Aug. 27, 2018 and English translation thereof; 8 pgs.
Office Action for Chinese Patent Application No. 201680009304.1 dated Aug. 31, 2018 and English translation thereof; 10 pgs.
International Search Report , PCT/IB2016/000188, dated Jun. 21, 2016, 4 pages.
Office Action for Chinese Patent Application No. 201680009304.1 dated Apr. 30, 2019 and English summary thereof; 7 pgs.
Office Action for Korean Patent Application No. 10-2019-7013159 dated May 28, 2019 and English translation thereof; 7 pgs.
Office Action for Japanese Patent Application No. 2015-142880 dated Feb. 19, 2019 and English translation thereof; 6 pgs.
Notice of Allowance for Korean Patent Application No. 10-2017-7022139 dated Feb. 20, 2019 and English translation thereof; 2 pgs.
Extended European Search Report for European Patent Application No. 16827315.9 dated Mar. 19, 2019; 7 pgs.
Office Action for Japanese Patent Application No. 2015-142880 dated Aug. 20, 2019 and English translation thereof; 6 pgs.
Office Action for Taiwanese Patent Application No. 105105823 dated Aug. 21, 2019 and English summary thereof; 7 pgs.

(Continued)

*Primary Examiner* — Sheeba Ahmed
(74) *Attorney, Agent, or Firm* — Hauptman Ham, LLP

(57) ABSTRACT

The present invention provides an adhesive resin layer and an adhesive resin film which can prevent generation of air bubbles even when they are thermally deformed after adhering to a substrate, and have good followability to deformation of a substrate of a laminate in which a substrate, an adhesive resin layer, and a substrate are laminated in an order. More particularly, the present invention is a monolayered adhesive resin layer comprising an acrylic-based adhesive resin composition, wherein the adhesive resin composition contains at least an acrylic-based polymer, an acrylic-based monomer or an acrylic-based oligomer, and a thermopolymerization initiator, the adhesive resin layer has pressure sensitive adhesiveness on both surfaces at an ambient temperature, and in differential scanning calorimetry at a temperature raising rate of 10° C./min, heat generation is observed at 80° C. or higher, and at least one peak is confirmed between 120° C. and 210° C.

8 Claims, 2 Drawing Sheets

(56) References Cited

OTHER PUBLICATIONS

Notice of Allowance for Chinese Patent Application No. 201680009304.1 dated Aug. 29, 2019; and English translation thereof; 4 pgs.
Organic Peroxides Catalogue, NOF Corporation Conversion Industries, p. 1-5, Table-1, Feb. 2015; 35 pages, and English translation.
Notice of Allowance for Korean Patent Application No. 10-2019-7013159 dated Oct. 20, 2019 and English translation thereof; 2 pgs.
Notice of Allowance for Japanese Patent Application No. 2015-142880 dated Nov. 12, 2019 and English translation thereof; 5 pgs.

* cited by examiner

ADHESIVE RESIN LAYER AND ADHESIVE RESIN FILM

CROSS REFERENCE TO RELATED APPLICATION

This Application is a 371 of PCT/IB2016/000188 filed on Feb. 29, 2016, which, in turn, claimed the priority of Japanese Patent Application No. 2015-142880 which was filed on Jul. 17, 2015.

TECHNICAL FIELD

The present invention relates to an adhesive resin layer and an adhesive resin film which can prevent generation of air bubbles even when thermally deformed after adhering to a substrate.

BACKGROUND TECHNOLOGY

As a pressure sensitive adhesive agent which can be easily released after use, a pressure sensitive adhesive agent, including an acrylic-based pressure sensitive adhesive agent, a photocurable acrylate compound such as urethane acrylate, an isocyanate-based curing agent (crosslinking agent), and a photopolymerization initiator, is used (for example, see Patent Documents 1 to 3). Since a pressure sensitive adhesive agent of this kind has pressure sensitive adhesiveness at an ambient temperature, and at the same time, can be re-released by reducing pressure sensitive adhesiveness by light irradiation, it is widely used in a pressure sensitive adhesive tape for semiconductor processing or for conveyance.

Meanwhile, an acrylic-based pressure sensitive adhesive agent is also widely used in order to laminate and adhere substrates having transparency or translucency, such as a touch panel, a cellular phone, a display, and a laminated glass. However, when a gap is generated between the substrate and the pressure sensitive adhesive agent, and air bubbles remain, the adhesion strength between substrates is liable to reduce. Additionally, in the case of intended use requiring transparency, optical property through the substrate may be reduced due to air bubbles.

DOCUMENTS OF RELATED ART

Patent Documents

Patent Document 1: Japanese Patent No. 3764133
Patent Document 2: Japanese Patent No. 3803200
Patent Document 3: Japanese Unexamined Patent Application, First Publication No. 2012-193321

SUMMARY OF THE INVENTION

Problem to be Solved by the Invention

The present invention was made in view of the above-mentioned circumstances, and an object thereof is to provide an adhesive resin layer and an adhesive resin film which can prevent generation of air bubbles even when thermally deformed after adhering to a substrate, and have good followability to deformation of a substrate of a laminate in which a substrate, an adhesive resin layer, and a substrate are laminated in an order.

Means for Solving the Problem

In order to solve the above-mentioned problems, the present invention provides a monolayered adhesive resin layer comprising an acrylic-based adhesive resin composition, wherein the adhesive resin composition contains at least (A) an acrylic-based polymer, (B) an acrylic-based monomer or an acrylic-based oligomer, and (C) a thermopolymerization initiator, the adhesive resin layer has pressure sensitive adhesiveness on both surfaces at an ambient temperature, and in differential scanning calorimetry (DSC) at a temperature raising rate of 10° C./min, heat generation is observed at 80° C. or higher, and at least one peak is confirmed between 120° C. and 210° C.

It is preferable that the (C) thermopolymerization initiator is a peroxide.

It is preferable that the adhesive resin composition contains 5 to 50 parts by weight of the (B) acrylic-based monomer or acrylic-based oligomer, based on 100 parts by weight of the (A) acrylic-based polymer.

It is preferable that the adhesive resin composition contains an acrylic-based monomer having a hydroxy group, as at least a part of the (B) acrylic-based monomer or acrylic-based oligomer.

It is preferable that the adhesive resin composition contains curable urethane acrylate as at least a part of the (B) acrylic-based monomer or acrylic-based oligomer.

Also, the present invention provides an adhesive resin film comprising the adhesive resin layer laminated between two separators.

Also, the present invention provides an adhesive resin layer for forming a laminate in which two substrates are laminated with the adhesive resin layer interposed between the two substrates.

Also, the present invention provides an adhesive resin layer, wherein a laminate obtained by laminating two substrates with the adhesive resin layer interposed between the two substrates is subjected to thermal deformation in a state where said laminate is held between two dies, and the adhesive resin layer has a pressure sensitive adhesive force of 10 N/25 mm or more even after being thermally cured.

Also, the present invention provides a laminate including two substrates laminated with the adhesive resin layer interposed between the two substrates.

Also, the present invention provides a method of producing a laminate comprising laminating two substrates with the adhesive resin layer interposed between the two substrates, and thermally curing the adhesive resin layer in a state where the resulting laminate is held between two dies.

When a boiling point of a solvent contained in a raw material composition of the adhesive resin layer is expressed as "Temperature A", a temperature at which the thermopolymerization initiator has a half-life of 1 minute is expressed as "Temperature B", a temperature at heating for removing the solvent in the step of producing the adhesive resin layer is expressed as "Temperature C", and a pressing temperature of a die in the step of thermally curing the adhesive resin layer is expressed as "Temperature D", it is preferable that each temperature is in an order of an equation (1) below:

Temperature A<Temperature C<Temperature B<Temperature D.  Equation (1)

It is preferable that a temperature of a die upon the thermal curing is a temperature of 150 to 300° C.

The present invention is characterized in that the adhesive resin composition comprises an acrylic-based polymer, an acrylic-based monomer or an acrylic-based oligomer, and a thermopolymerization initiator, and a transfer tape-like adhesive resin layer can be prepared by the above-mentioned components. The adhesive resin layer has substrate followability to a substrate due to the acrylic-based monomer or the acrylic-based oligomer. The acrylic-based monomer or the acrylic-based oligomer is cured by the reaction initiation condition such as heat, and an adhesive resin layer in which air bubbles are not generated even when thermally deformed after adhering to a substrate, as well as a method of producing such adhesive resin layer can be provided. Particularly, by contrivance of an addition amount of the acrylic-based monomer or the acrylic-based oligomer, followability to a substrate, and the strength of the transfer tape-like adhesive resin layer itself can be retained. According to the present invention, it has become possible that the adhesive resin layer is almost forced to follow a substrate forcibly, particularly by thermal pressing. At producing of a laminate, not curing by electron beam irradiation or energy ray irradiation through the air, but thermal pressing in which both heat and pressure are applied to the laminate not through the air is preferable from a view point of suppression of air bubble generation, and followability to deformation of a substrate.

Effects of Invention

According to the present invention, there can be provided an adhesive resin layer and an adhesive resin film which can prevent generation of air bubbles even when thermally deformed after adhering to a substrate.

BEST MODE FOR CARRYING OUT THE INVENTION

Referring to the figures, the present invention will be illustrated below based on preferable embodiments.

Figure 1:
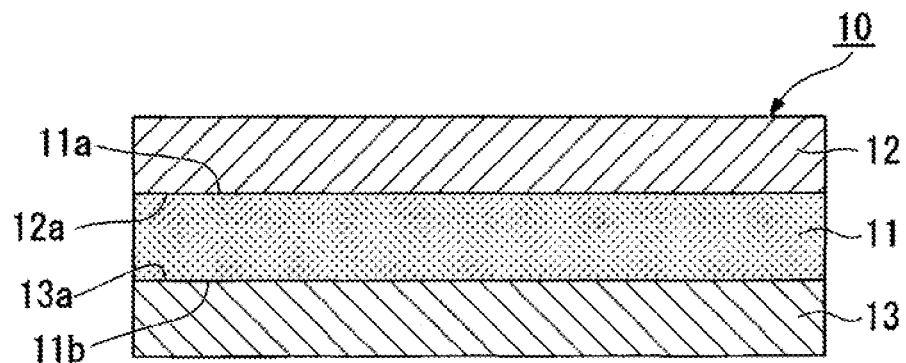
FIG. 1 is a cross-sectional view showing one example of the adhesive resin film of the present invention.

FIG. 1 shows a cross-sectional view of one example of an adhesive resin film 10. The adhesive resin film 10 has two separators 12, 13, and an adhesive resin layer 11 which is laminated between them. An adhesive resin composition constituting the adhesive resin layer 11 contains (A) an acrylic-based polymer, (B) an acrylic-based monomer or an acrylic-based oligomer, and (C) a thermopolymerization initiator. Both surfaces 11a, 11b of the adhesive resin layer 11 have pressure sensitive adhesiveness at an ambient temperature (are pressure sensitive adhesive surfaces).

In addition, in the present specification, the "ambient temperature" is about 3° C. to about 40° C., preferably about 10° C. to about 30° C., more preferably about 15° C. to about 25° C., and most preferably about 23° C.

The adhesive resin layer 11 includes the adhesive resin composition over the entirety of a thickness direction. The adhesive resin layer 11 may be composed of two or more layers including the same kind or different kinds of adhesive resin compositions, as far as the layer includes the adhesive resin composition satisfying the requirement. When the adhesive resin layer 11 is composed of a monolayered adhesive resin layer, since a layer configuration can be simplified to reduce the cost, it is preferable. The adhesive resin composition includes an acrylic-based adhesive resin (polymer). Optical property of the adhesive resin composition is not limited, but the composition may have transparency, or may be translucent or opaque.

Separators 12, 13 have releasability on surfaces 12a, 13a on a side contacting with the adhesive resin layer 11 (are release surfaces). Examples of a configuration of separators 12, 13 include a configuration that a release layer is provided on one side or both sides of a resin film, and a configuration that a release agent is contained in a resin of a resin film. In place of the resin film, a paper, a synthetic paper, a metal foil, various sheets or the like may be used. When separators 12, 13 have transparency, since optical test of the adhesive resin layer 11 can be performed using the adhesive resin film 10 from which separators 12, 13 have not been released, as it is, this is preferable.

Figure 2:
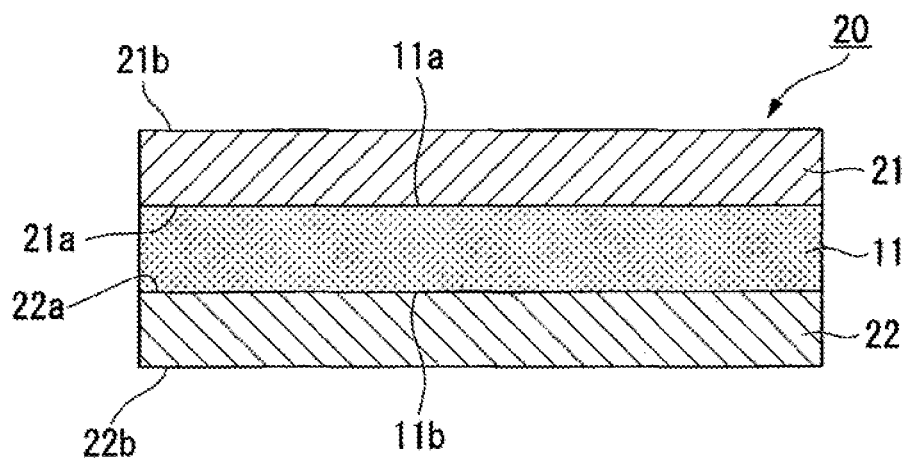
FIG. 2 is a cross-sectional view showing one example of a laminate in which an adhesive resin layer is laminated between two substrates.

Two substrates can be adhered to the adhesive resin film 10 shown in FIG. 1, with pressure sensitive adhesive surfaces 11a, 11b which are exposed by releasing separators 12, 13 from the adhesive resin layer 11. FIG. 2 shows one examples of a laminate 20 in which two substrates 21, 22 are laminated with the adhesive resin layer 11 interposed between the two substrates. Two substrates 21, 22 are contacted with the adhesive resin layer 11 by one side surfaces 21a, 22a, and surfaces 21b, 22b on reverse sides are not contacted with the adhesive resin layer 11 and are vacant so that thermal pressing with a die is possible.

Substrates 21, 22 are an adherent which is adhered with the adhesive resin layer 11. Respective substrates 21, 22 may be a rigid plate, or may have flexibility like a film. For example, the substrates may be a single plate of a glass, polycarbonate, acryl, various resins, a ceramic, a metal or the like, or may be a composite composed of a plurality of materials, such as a liquid crystal panel, a touch panel, a cover glass, and a wiring substrate. A material, a thickness, a shape, and the like of substrates 21, 22 may be all the same, or may be different. Internal surfaces 21a, 22a and outer surfaces 21b, 22b of substrates 21, 22 may be flat, respectively, or any one side or both sides may have a level difference or irregularities.

When after the adhesive resin layer 11 is adhered to substrates 21, 22, substrates 21, 22 are thermally deformed, as a material of substrates 21, 22, a thermoplastic resin such as polyolefin, polyester, polycarbonate, polyamide, acryl, polyvinyl chloride, and cellulose ester is preferable. A substrate used in thermal deformation is not limited to a single body of a substrate (film and the like) of a thermoplastic resin, and a substrate may contain a thin film, a pattern, a particle, a fine line, a fine structure or the like of a different material (metal, inorganic material, organic material or the like), on a surface or in the interior of the substrate.

When a laminate 20 as shown in FIG. 2 is formed, an order of releasing separators 12, 13 is not particularly limited. After one substrate is adhered to one pressure sensitive adhesive surface which is exposed by releasing one separator, the other substrate may be adhered to the other pressure sensitive adhesive surface which is exposed by releasing the other separator. After both separators are released to expose both pressure sensitive adhesive surfaces, substrates may be adhered, respectively.

Since the adhesive resin layer 11 contains the (B) acrylic-based monomer or acrylic-based oligomer having flowability, it has high softness, and the entirety of contact surfaces 21a, 22a of substrates 21, 22 can be wetted with the adhesive resin composition. For this reason, even when the laminate 20 is thermally deformed after adhering to substrates 21, 22, air bubbles can be suppressed. Since the adhesive resin layer 11 contains the (C) thermopolymerization initiator, connection can be made to be more firm, by thermal curing the layer after adhering. When compared with ultraviolet irradiation, there is an advantage that facilities of thermal curing are simple, and even when the substrates 21, 22 contain a portion having low translucency, or even when the adhesive resin layer 11 hardly transmits ultraviolet light by coloring or the like, the layer is securely cured.

By heating the laminate 20 obtained by laminating two substrates 21, 22 with the adhesive resin layer 11 interposed therebetween in the state where it is held between two dies, the adhesive resin layer 11 can be cured. Thereby, a reaction of the (A) acrylic-based polymer and the (B) acrylic-based monomer or acrylic-based oligomer (polymerization, crosslinking or the like) progresses, and an adhering force between substrates 21, 22 is increased. Additionally, by performing pressurization together with heating, even when air bubbles remain between substrates 21, 22 and the adhesive resin layer 11, gaps are filled, and air bubbles can be removed. Upon thermal curing, at least one of two dies is heated.

When the laminate 20 is thermally pressed, a cushion (buffer sheet), a release sheet, a protective sheet or the like (inclusion) may intervene between two dies and the laminate (more particularly, outer surfaces 21b, 22b of substrates 21, 22). When two dies have irregularities on pressing surface to the laminate, since when a convex portion of dies is directly contacted with the laminate, the pressure is easily concentrated on the convex portion, it is preferable that the above-mentioned inclusion is provided.

Two dies may or may not cover a side surface of the laminate 20. For example, when one die is made to be a convex type, and the other die is made to be a concave type, after the laminate 20 is housed in a concave portion of the concave type, a convex portion of the convex type may approach toward the concave portion of the concave type.

Figure 3:
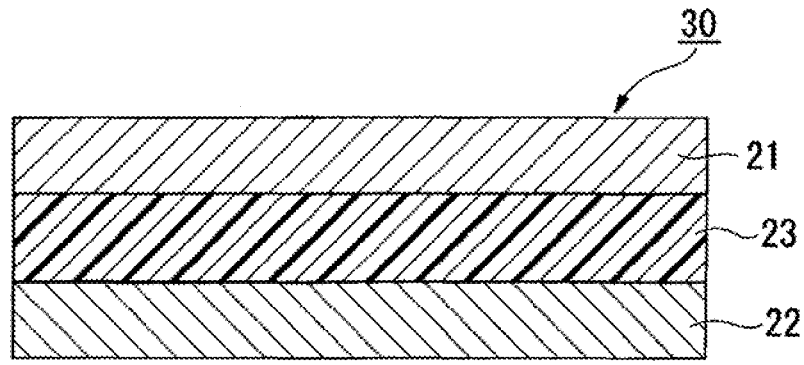
FIG. 3 is a cross-sectional view showing one example of a laminate in which an adhesive resin layer was thermally cured.

FIG. 3 shows one example of a laminate 30 which is obtained by thermal curing. In this laminate 30, as a result of thermal curing of the adhesive resin layer 11, an adhesive layer 23 containing the thermally cured adhesive resin is laminated between two substrates 21, 22. Since hardness of the adhesive layer 23 after thermal curing has been increased, even when the adhesive resin layer 11 before heating is soft, re-release is difficult. Thereby, as the adhesive resin layer 11, a resin which is excellent in followability to deformation of the substrate despite a low adhering force can be used. It is preferable that after thermal curing of the adhesive resin layer 11, a pressure sensitive adhering force (adhering force) of the adhesive layer 23 is 10 N/25 mm or more.

Upon producing of the laminate 30, when two substrates 21, 22 are distinguished, several producing methods are contemplated. For producing the laminate 30, any methods can be adopted.

As a first laminating method, a method comprising laminating the adhesive resin layer 11 on a first substrate 21, thereafter, performing autoclave treatment, laminating the second substrate 22 on the adhesive resin layer 11, laminating the laminate 20, and thereafter, or while a second substrate 22 being laminated, thermally curing the adhesive resin layer 11 using two dies can be mentioned.

As a second laminating method, a method comprising laminating the adhesive resin layer 11 on the second substrate 22, thereafter, performing autoclave treatment, laminating the first substrate 21 on the adhesive resin layer 11, and thereafter, or while the first substrate 21 being laminated, thermally curing the adhesive resin layer 11 using two dies can be mentioned.

As a third laminating method, a method comprising laminating the first substrate 21, the adhesive resin layer 11, and a second substrate 22 at the same time, and thereafter, or simultaneously with lamination, thermally curing the adhesive resin layer 11 using two dies can be mentioned.

In the first or second laminating method, by adhering one of substrates 21, 22 and the adhesive resin layer 11 previously to perform autoclave treatment, the adhesive resin layer has become easy to follow one of substrates 21, 22. When a level difference, a concave portion or the like exists on a surface of one substrate to easily generate a gap between the adhesive resin layers, since this gap can be filled by autoclave treatment, this is a method capable of reducing air bubbles even when condition for thermal pressing is greatly fluctuated. Additionally, the third laminating method is a method having greatest merits in the cost, in a point that a producing process can be shortened.

Figure 4:
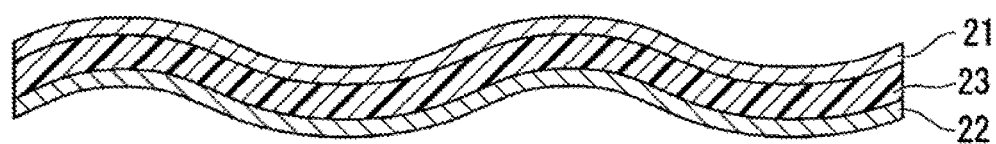
FIG. 4 is a cross-sectional view showing one example of a curved laminate in which an adhesive resin layer was thermally cured.

When the adhesive resin layer 11 is laminated between substrates 21, 22 to perform thermal pressing, one or both of substrates 21, 22 can also be deformed to generate irregularities in the laminate. For example, when irregularities are provided on pressing surfaces of two dies, substrates 21, 22 having flexibility such as a resin film can be deformed in an irregular shape. By possession of flowability by the initial adhesive resin layer 11, it can follow irregularities of substrates 21, 22. Additionally, during thermal pressing, by progression of thermopolymerization, the adhesive resin layer 11 can be cured to suppress generation of gaps or air bubbles. Furthermore, by connection of substrates 21, 22 with the adhesive layer 23, deformation of substrates 21, 22 can be fixed to realize molding of irregularities, curved surface, bending, curvature or the like as shown in FIG. 4. When a convex portion is formed on an internal surface of the substrate, a concave portion may be formed on an outer surface on a back side. In FIG. 4, a corrugated molded body was mentioned as one example, but a molded body is not particularly limited to this, and an arbitrary shape can be molded.

It is preferable that in the adhesive resin layer 11, in differential scanning calorimetry (DSC) at a temperature raising rate of 10° C./min, heat generation is observed at 80° C. or higher, and at least one peak is confirmed between 120° C. and 210° C. When heat generation is confirmed at lower than 80° C., a reaction of thermal curing is liable to progress, for example, even at an ambient temperature, and preservability is reduced. By confirmation of a peak between 120° C. and 210° C., thermal curing can progress at a temperature equivalent thereto. Furthermore, it also becomes easy to deform substrate 21, 22 by thermal softening.

In order to improve handleability of the adhesive resin layer 11, it is preferable that the adhesive resin layer 11 is thermally cured by heating at a temperature of 100 to 250° C. and a time of 30 seconds to 10 minutes. It is preferable that the layer is thermally cured under the condition of at least a part of these temperature and time ranges, and it is more preferable that the layer is thermally curable in the whole ranges. The thermal curing condition at practical use may be outside the above-mentioned ranges. However, from the viewpoint of preservability, it is preferable that thermal curing does not substantially progress at an ambient temperature, and it is preferable that the layer has a nature that it is not thermally cured by heating, for example, within 10 minutes at a temperature of 100° C. or lower.

In the state where the adhesive resin layer 11 is uncured (before heating), it is preferable that a storage elastic modulus at a temperature of 23° C. is $1 \times 10^4$ to $1 \times 10^6$ Pa. Additionally, after the adhesive resin layer 11 has been thermally cured by heating, it is preferable that a storage elastic modulus at a temperature of 23° C. is $1 \times 10^4$ to $1 \times 10^9$ Pa. It is preferable that a storage elastic modulus at a temperature of 23° C. after thermal curing by heating is higher than a storage elastic modulus at a temperature of 23° C. before heating. These storage elastic moduli can be measured by making the adhesive resin layer in the uncured state (before heating), and the adhesive resin layer after thermal curing by heating (adhesive layer after thermal curing) have a temperature of 23° C., respectively. The vibration frequency when a storage elastic modulus is measured is, for example, 1 Hz. When a storage elastic modulus of the adhesive layer after thermal curing is measured, the adhesive layer after thermal curing can be obtained as a single body by heating and curing the adhesive resin layer between separator films without adhering the adhesive resin layer to the substrate, and thereafter, releasing the separator films.

Then, the adhesive resin layer which is also a transfer tape will be illustrated in further detail.

Since it becomes possible to coat an adhesive raw material composition used in producing the adhesive resin layer of the present invention at a better precision of a thickness when the composition is dissolved in an organic solvent, it is preferable that the composition contains an organic solvent. By drying a solvent from the adhesive raw material composition, an adhesive resin layer is obtained. That is, the constitution of the adhesive raw material composition may be such that the solvent is added to the constitution of the adhesive resin composition constituting the adhesive resin layer. The adhesive resin layer can function as a pressure sensitive adhesive layer at an ambient temperature (before thermal curing).

Examples of a monomer constituting the (A) acrylic-based polymer include an acrylic-based monomer having an ester group (—COO—), an acrylic-based monomer having a carboxyl group (—COOH), an acrylic-based monomer having an amido group (—CONR$_2$ wherein R is a substituent such as a hydrogen atom or an alkyl group), an acrylic-based monomer having a nitrile group (—CN), and a non-acrylic-based monomer such as olefins, styrene, vinyl esters, vinyl ethers, and vinylsilane. As the (A) acrylic-based polymer, a copolymer composed of two or more monomers is preferable. A number average molecular weight of the (A) acrylic-based polymer before photopolymerization is preferably, for example, about 50,000 to 1,000,000. Examples of the viscosity include about 1,000 to 10,000 mPa·s.

Examples of the acrylic-based monomer having an ester group (—COO—) include alkyl (meth)acrylate, (meth)acrylate having a hydroxyl group (hydroxy group), (meth)acrylate having an alkoxy group or a polyether group, (meth)acrylate having an amino group or a substituted amino group, and the like. In addition, in the present specification, (meth)acrylate is a generic name of acrylate and methacrylate.

Examples of the acrylic-based monomer having a carboxyl group (—COOH) include acrylic acid, methacrylic acid, (meth)acrylate having a carboxyl group (—COOH), and the like.

Examples of the acrylic-based monomer having an amido group (—CONR$_2$ wherein R is a substituent such as a hydrogen atom or an alkyl group) include acrylamide, methacrylamide, and the like.

Examples of the acrylic-based monomer having a nitrile group (—CN) include acrylonitrile, methacrylonitrile, and the like.

It is preferable that in the (A) acrylic-based polymer, 50% by weight or more of a constituent monomer is composed of an acryl-based monomer. Particularly, it is preferable that 50% by weight or more of the constituent monomer is composed of one or two or more of alkyl (meth)acrylates represented by the general formula $CH_2=CR^1-COOR^2$ (wherein $R^1$ represents hydrogen or a methyl group, and $R^2$ represents an alkyl group having 1 to 14 carbon atoms). Specific examples of the alkyl (meth)acrylate include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-pentyl (meth)acrylate, isopentyl (meth)acrylate, n-hexyl (meth)acrylate, 2-ethylhexyl (meth)acrylate, n-octyl (meth)acrylate, isooctyl (meth)acrylate, isononyl (meth)acrylate, decyl (meth)acrylate, and dodecyl (meth)acrylate. Particularly, it is preferable to essentially use alkyl (meth)acrylate in which the carbon number of an alkyl group $R^2$ is 4 to 12 (for example, 50 to 100 mole %).

Additionally, examples of (meth)acrylate containing a hydroxy group include one or two or more kinds of 2-hydroxyethyl (meth)acrylate, 2-hydroxypropyl (meth)acrylate, 3-hydroxypropyl (meth)acrylate, 4-hydroxybutyl (meth)acrylate, 6-hydroxyhexyl (meth)acrylate, 8-hydroxyoctane (meth)acrylate, polyethylene glycol mono(meth)acrylate, polypropylene glycol mono(meth)acrylate, cyclohexanedimethanol mono(meth)acrylate, and the like.

Out of the (B) acrylic-based monomer or acrylic-based oligomer, examples of the acrylic-based monomer include one or two or more kinds of the same monomers as the monomers constituting the (A) acrylic-based polymer, for example, alkyl (meth)acrylate, (meth)acrylate having a hydroxy group, acrylamide, and the like. The number of polymerizable functional groups such as a (meth)acryloyl group in one molecule may be 1 or 2 or more.

Particularly, when as at least a part of the (B) acrylic-based monomer or acrylic-based oligomer, a monomer of (meth)acrylate having a hydroxy group is contained, a hydroxy group having polarity becomes easy to be dispersed in the whole adhesive resin layer. Thereby, since the moisture is hardly condensed, and cloudiness of the adhesive resin layer is suppressed even under the environment having high humidity (further high temperature), the above is preferable. In (meth)acrylate having a hydroxy group, the number of hydroxy groups in one molecule may be 1 or 2 or more.

Additionally, as at least a part of the (B) acrylic-based monomer or acrylic-based oligomer, curable urethane acrylate can be used. The urethane acrylate is a compound having a urethane bond (—NH—COO—) and a (meth)acryloyloxy group ($CH_2=CX-COO-$ wherein X=H or $CH_3$) in the same molecule. The curable urethane acrylate is a compound having curability due to a (meth)acryloyloxy group which is a polymerizable functional group, among urethane acrylates. The number of urethane bonds in one molecule may be 1 or 2 or more. Additionally, the number of (meth)acryloyloxy groups in one molecule may be 1 or 2 or more.

Examples of urethane acrylate include a compound obtained by reacting a (meth)acrylate compound having a hydroxy group and an isocyanate compound; a compound obtained by reacting a urethane prepolymer obtained by reacting a polyol compound and a polyisocyanate compound, with a (meth)acrylate compound having a hydroxy group; and the like. Examples of the polyol compound include polyester polyol, polyether polyol, and the like.

It is preferable that the (B) acrylic-based monomer or acrylic-based oligomer becomes a part of a polymer by thermal curing due to the (C) thermopolymerization initiator, and is the liquid (fluid) having the viscosity lower than that of the polymer. It is also possible to concurrently use the acrylic-based monomer and the acrylic-based oligomer. Examples of the acrylic-based oligomer include acrylate oligomers such as urethane acrylate oligomer. The number of polymerizable functional groups possessed by the (B) acrylic-based monomer or acrylic-based oligomer is, for example, 1 to 10, and preferably 2 to 5.

It is preferable that the adhesive resin composition contains 5 to 50 parts by weight of the (B) acrylic-based monomer or acrylic-based oligomer, based on 100 parts by weight of the (A) acrylic-based polymer. When an addition amount of the (B) acrylic-based monomer or acrylic-based oligomer is too large, an adhering force of the adhesive resin layer may be reduced too much, when thermally polymerized.

Examples of the (C) thermopolymerization initiator include a radical initiator which is degraded by heat to initiate polymerization of a monomer (radical polymerization) and curing of a resin. As the radical initiator, a redox initiator, an organometallic compound, and the like, which act at a low temperature, are known, but from a point of handleability of the adhesive resin layer, an (organic) peroxide-based, an azo-based, and the like, which act at a higher temperature, are preferable. Since the thermopolymerization initiator is not reacted or halved during manufacturing of a transfer tape, particularly, in a step of drying a solvent, it is preferable that a temperature at which a half-life of the thermopolymerization initiator becomes 1 minute (hereinafter, this may be referred to as "1-minute half-life temperature") is higher than a boiling point of an organic solvent contained in the adhesive raw material composition. Additionally, it is preferable that the thermopolymerization initiator is a material having a 1-minute half-life temperature which is lower than a thermal pressing set temperature by 50° C. or more, to sufficiently react at a temperature at thermal pressing for a certain period of time.

Specific examples of the (organic) peroxide-based thermopolymerization initiator include diacyl peroxides such as benzoyl peroxide, acetyl peroxide, decanoyl peroxide, and lauroyl peroxide; dialkyl peroxides such as dicumyl peroxide and di-t-butyl peroxide; alkylperoxy esters such as t-butyl peroxybenzoate and t-butyl peroxy-2-ethylhexanoate; hydroperoxides such as cumene hydroperoxide and t-butyl hydroperoxide; and the like. Among them, an organic peroxide having the above-mentioned 1-minute half-life temperature of 100° C. or higher is preferable, and an organic peroxide having the 1-minute half-life temperature in the range of 100° C. to 200° C. is more preferable. Examples of such an organic peroxide include t-hexyl peroxyneodecanoate, t-butyl peroxyneodecanoate, t-hexyl peroxyneoheptanoate, t-hexyl peroxypivalate, t-butyl peroxypivalate, dilauroyl peroxide, 1,1,3,3-tetramethylbutylperoxy-2-ethylhexanoate, disuccinic acid peroxide, t-hexylperoxy-2-ethylhexanoate, t-butyl peroxy-2-ethylhexanoate, 1,1-bis(t-hexylperoxy) cyclohexane, 1,1-bis(t-butylperoxy) cyclohexane, t-hexyl peroxyisopropyl monocarbonate, t-butylperoxymaleic acid, t-butyl peroxy-3,5,5-trimethylhexanoate, t-butyl peroxyisopropyl monocarbonate, t-butyl peroxy-2-ethylhexyl monocarbonate, t-butyl peroxylaurate, t-hexyl peroxybenzoate, t-butyl peroxyacetate, t-butyl peroxybenzoate, n-butyl 4,4-bis(t-butylperoxy) valerate, dicumyl peroxide, di-t-hexyl peroxide, di-t-butyl peroxide, p-menthane hydroperoxide, and the like.

Examples of the azo-based thermopolymerization initiator include 2,2'-azobis(isobutyronitrile), 2,2'-azobis(2-methylbutyronitrile), 2,2'-azobis(2,4-dimethylvaleronitrile), 2,2'-azobis(4-cyanovaleronitrile), 2,2'-azobis(4-methoxy-2,4-dimethylvaleronitrile), 2,2'-azobis(methylisobutyrate), 1,1'-azobis(1-cyclohexanecarbonitrile), and the like. Additionally, as the polymerization initiator of the present invention, a thermopolymerization initiator which is sealed into a molecular capsule having a cage-like molecule can be used to control reactivity. It is preferable that the cage-like molecule has an anthracene structure.

It is preferable that an addition amount of the (C) thermopolymerization initiator is 0.001 to 0.5 parts by weight, based on 100 parts by weight of the (A) acrylic-based polymer.

A polymerization retarder can be added to the adhesive resin layer in the present invention. By use of the polymerization retarder, it becomes easy to control a polymerization degree. Additionally, use of the polymerization retarder is preferable from the viewpoint that followability to deformation of a substrate is improved.

The adhesive resin composition can further contain arbitrary components other than (A) to (C). For example, (D) a crosslinking agent (curing agent) such as an isocyanate-based crosslinking agent, an epoxy-based crosslinking agent or a metal chelate compound is suitably used to crosslink the (A) acrylic-based polymer, or a polymer which is produced by polymerization of the (B) acrylic-based monomer or acrylic-based oligomer. In this case, as necessary, a polymer or a monomer having a functional group reacting with the (D) crosslinking agent is used, as at least a part of the (A) acrylic-based polymer or the (B) acrylic-based monomer or acrylic-based oligomer. For example, in the case of the isocyanate-based crosslinking agent, the functional group reacting with the (D) crosslinking agent is a hydroxy group or a carboxyl group or the like. An addition amount of the (D) crosslinking agent is preferably, for example, 1.5 equivalents or less relative to the functional group of the polymer.

Curing of the (A) acrylic-based polymer with the (D) crosslinking agent (curing agent) may progress by aging, at a stage at which the adhesive resin layer before adhering to an adherent is produced.

Examples of other arbitrary components include, for example, an antioxidant, a filler, a plasticizer, and the like. The adhesive raw material composition used in producing the adhesive resin layer may contain water or a solvent such as an organic solvent, or may be a solvent-free syrup-like composition. When a material which is potentially corroded, such as an oxide electrically conductive film such as ITO; a base metal; or the like, exists on a substrate, and the adhesive resin layer is contacted with this, it is preferable to reduce a corrosive component such as an acid, for example, by using a polymer having a low acid value, as a material of the adhesive resin composition.

It is preferable that the acrylic-based monomer or the acrylic-based oligomer being a component which is cured at producing of the adhesive resin layer of the present invention is cured as much as possible. Additionally, when the acrylic-based oligomer is used, the acrylic-based polymer and the acrylic-based oligomer have a great molecular weight, and compatibility as a paint frequently becomes bad. For this reason, it is desirable to add a compatibilizer. The compatibilizer having no reactivity may be used, but since there is a possibility that it is separated at a pressure sensitive adhesive layer, there is a high possibility that a usable material is limited, and moreover, there is a possibility that the problem of expansion at a durability test or the like arises depending on a kind or an addition amount, and versatility thereof is low. For this reason, since a compatibilizer which is cured together with the acrylic-based oligomer at a thermal reaction is polymerized, this also leads to suppression of expansion or the like, and accordingly, it is preferable to select a material carrying a reactive group. Furthermore, when an acrylic-based monomer which becomes hard after a thermal reaction is used as a compatibilizer, stability of the paint and, at the same time, the effect that a pressure sensitive adhesive layer becomes hard after curing can also be expected. Since the acrylic-based monomer is good in compatibility and, additionally, has the lower viscosity as compared with the acrylic-based polymer or the urethane acrylate oligomer, it becomes possible to adjust to the optimal viscosity at film formation by adding it when the viscosity of the paint is too high, and this also contributes to improvement in productivity.

(Method of Producing Adhesive Resin Layer)

The adhesive resin layer (transfer tape) in the present invention can be produced by applying the adhesive raw material composition on a separator film in the state where it contains a solvent, drying and, further, protecting this with a separator film. It is preferable that the adhesive raw material composition is applied using a die or a pipe doctor. In drying the solvent, drying with a drier or the like is preferable. Regarding a time for drying the solvent, in view of productivity, 10 minutes or shorter is preferable, and 2 to 5 minutes is further preferable. Additionally, since it is necessary to sufficiently dry the organic solvent, it is preferable to perform drying at a temperature not lower than a boiling point of the organic solvent, and it is preferable to perform drying at not higher than a 1-minute half-life temperature of the thermopolymerization initiator.

As described above, the present invention has been illustrated based on preferable embodiments, but the present invention is not limited to the above-mentioned embodiments, and can be variously modified in a range not departing from the gist of the present invention.

The laminate may have the adhesive resin layer between 3 or more substrates, respectively. It is preferable that one or more (preferably, all) of two or more adhesive resin layers contained in the laminate is (are) adhesive resin layer(s) of the present embodiment.

When the laminate is thermally pressed, two or more laminates may be arranged between a pair of dies. This arrangement is not particularly limited, but two or more laminates may be stacked in a direction of pressurization with the dies, or two or more laminates may be aligned in a plane vertical to a pressurization direction (for example, on a pressing surface of any die). The above-mentioned inclusion may intervene between two or more laminates.

In the present invention, after producing of the adhesive resin layer 11 as shown in FIG. 1, a laminate structure as shown in FIG. 2 is prepared, and the laminate 30 as shown in FIG. 3 can be prepared via thermal treatment such as thermal pressing, and it is preferable that a step of removing the solvent by heating from the adhesive raw material composition containing the solvent is provided, at the time of producing of the adhesive resin layer 11 of FIG. 1. Additionally, in the process condition after later adhering, it is necessary to heat the adhesive resin layer 11 to initiate polymerization.

In order to apply heat so that a temperature for heating the laminate becomes 100 to 250° C. at the time of pressing in the present invention, it is necessary to heat the die at a temperature higher than a desired heating temperature. It is preferable that a temperature of the die is 100 to 300° C.

Regarding a pressing time in the present invention, from the viewpoint of productivity, it is preferable that a reaction is completed in a short time, for example, within 5 minutes. Additionally, regarding a pressing temperature and time, they can be set so that the strength of the laminate becomes sufficient.

EXAMPLES

The present invention will be specifically illustrated below by way of examples.

Example 1

Using SK Dyne (registered trademark) 2094 (Soken Chemical & Engineering Co., Ltd.) as a polymer solution containing the acrylic-based polymer, and E-AX (Soken Chemical & Engineering Co., Ltd.) as the crosslinking agent, the crosslinking agent was blended at the ratio of 0.2 parts by weight, based on 100 parts by weight of the acrylic-based polymer. To the resulting mixture were added 40 parts by weight of 4-hydroxybutyl acrylate (Osaka Organic Chemical Industry Ltd.; 4HBA) of the acrylic-based monomer as a flowable resin component having reactivity, and 0.08 parts by weight of t-butylperoxy-2-ethyl hexanoate (manufactured by NOF Corporation; product name: Perbutyl (registered trademark) O) as the thermopolymerization initiator, to prepare an adhesive raw material composition. The adhesive raw material composition contains ethyl acetate (boiling point 77° C.) as a solvent, and has an improved nature such as the viscosity as the paint for coating.

After the adhesive raw material composition was applied on an upper surface of a separator (manufactured by Fujimori Kogyo Co., Ltd; product name: 125E-0010DG2.5AS, thickness 125 μm) using an applicator so that a thickness of the adhesive resin layer (pressure sensitive adhesive layer) after drying became 50 μm, and the solvent was dried in a drying step under the condition of 90° C. for 2 minutes, to prepare a laminate in which the adhesive resin layer is laminated.

Then, to an upper surface of the adhesive resin layer of the resulting laminate, a separator (manufactured by Fujimori Kogyo Co., Ltd; product name: 38E-0010 BDAS, thickness 38 μm) was adhered to prepare an adhesive resin film of Example 1.

Thereafter, a reaction between the acrylic-based polymer and the crosslinking agent (epoxy-based) was completed by performing aging for a week, to form an adhesive resin layer in which three components of the crosslinked acrylic-based polymer, the flowable resin component having reactivity, and the thermopolymerization initiator exist.

Regarding Examples 1 to 19 and Comparative Examples 1 to 8, a laminate containing the adhesive resin layer between separator films was produced, under the constitution of the adhesive raw material composition described in Table 1 and a thickness of the adhesive resin layer described in Table 2. Matters which are not described in Table 1 or Table 2 are the same as those of Example 1. In Example 2 and Examples 6 to 9, an isocyanate-based crosslinking agent (TD-75, Coronate HX) reacts with not only a functional group of the acrylic-based polymer, but also a part of the acrylic-based monomer (4HBA) containing a hydroxy group to form the crosslinked acrylic-based polymer, and also in that case, like Example 1, three kinds of the crosslinked acrylic-based polymer, the flowable resin component having reactivity, and the thermopolymerization initiator exist in the adhesive resin layer.

TABLE 1

Constitution of adhesive raw material composition

| | Acrylic-based polymer/ part by weight | Crosslinking agent/equivalent | Flowable resin component having reactivity/ part by weight | Initiator/ part by weight |
|---|---|---|---|---|
| Example 1 | SK DYNE 2094/100 | E-AX/0.2 | 4HBA/40 | Perbutyl O/0.08 |
| Example 2 | SK DYNE 2147/100 | TD-75/0.16 | 4HBA/40 | Perbutyl O/0.08 |
| Example 3 | SK DYNE 2094/100 | E-AX/0.2 | 4HBA/5 | Perbutyl O/0.08 |
| Example 4 | SK DYNE 2094/100 | E-AX/0.2 | 4HBA/45 | Perbutyl O/0.08 |
| Example 5 | SK DYNE 2094/100 | E-AX/0.2 | 4HBA/60 | Perbutyl O/0.08 |
| Example 6 | N-7136/100 | Coronate HX/0.6 | 4HBA/28 | Perbutyl O/0.28 |
| Example 7 | N-7136/100 | Coronate HX/0.6 | 4HBA/36 | Perbutyl O/0.36 |
| Example 8 | N-7136/100 | Coronate HX/0.3 | 4HBA/12 | Perbutyl O/0.12 |
| Example 9 | N-7136/100 | Coronate HX/0.75 | 4HBA/36 | Perbutyl O/0.36 |
| Example 10 | SK DYNE 2094/100 | E-AX/0.56 | UV-3310B/5 | Perhexa V/0.04 |
| Example 11 | SK DYNE 2094/100 | E-AX/0.56 | UV-3310B/20 | Perhexa V/0.04 |
| Example 12 | SK DYNE 2094/100 | E-AX/0.56 | UV-3310B/20 UV-1700/20 | Perhexa V/0.08 |
| Example 13 | SK DYNE 2094/100 | E-AX/0.56 | UV-3310B/20 UV-1700/20 | Perhexa V/0.06 |
| Example 14 | SK DYNE 2094/100 | E-AX/0.56 | UV-3310B/20 UV-1700/20 | Perhexa V/0.04 |
| Example 15 | SK DYNE 2094/100 | E-AX/0.56 | UV-3310B/20 UV-1700/20 | Perocta O/0.04 |
| Example 16 | SK DYNE 2094/100 | E-AX/0.56 | UV-3310B/20 UV-1700/20 | Perhexa HC/0.04 |
| Example 17 | SK DYNE 2094/100 | E-AX/0.56 | UV-3310B/20 UV-1700/20 | Perhexyl Z/0.04 |
| Example 18 | N-7136/100 | Coronate HX/0.75 | UV-3310B/20 UV-1700/20 | Perocta O/0.03 |
| Example 19 | SK DYNE 2094/100 | E-AX/0.56 | UV-3310B/15 UV-1700/15 4HBA/15 | Perocta O/0.04 |
| Comparative Example 1 | SK DYNE 2094/100 | E-AX/0.2 | — | — |
| Comparative Example 2 | SK DYNE 2094/100 | E-AX/0.2 | 4HBA/40 | Irg651/0.4 |
| Comparative Example 3 | SK DYNE 2094/100 | E-AX/0.2 | 4HBA/40 | — |
| Comparative Example 4 | SK DYNE 2094/100 | E-AX/0.2 | 4HBA/40 | Percumyl ND/0.08 |
| Comparative Example 5 | SK DYNE 2094/100 | E-AX/0.2 | — | Perbutyl O/0.08 |
| Comparative Example 6 | SK DYNE 2094/100 | E-AX/0.56 | 4HBA/12 | Perbutyl O/7 |
| Comparative Example 7 | SK DYNE 2094/100 | E-AX/0.56 | UV-3310B/20 | — |
| Comparative Example 8 | SK DYNE 2094/100 | E-AX/0.56 | UV-3310B/20 | Percumyl P/0.08 |

In addition, in Table 1, when a product is commercially available as a solution, a numerical value of part by weight indicates part by weight of each component constituting the adhesive resin layer among it.

"SK Dyne 2094" and "SK Dyne 2147" represent a product name of the acrylic-based polymer, SK Dyne (registered trademark) 2094 (Soken Chemical & Engineering Co., Ltd., acid value: 33, number average molecular weight 70,000, solid content concentration 25%), and SK Dyne (registered trademark) 2147 (Soken Chemical & Engineering Co., Ltd., acid value: 33), respectively. "N-7136" represents a product name of the acrylic-based polymer, COPONYL (registered trademark) N-7136 (The Nippon Synthetic Chemical Industry Co., Ltd., solid content concentration 32%). In Table 1, the weight in terms of solid content of each material is described as an addition amount part by weight.

"Coronate HX" represents a product name of a polyisocyanate-based curing agent, Coronate (registered trademark) HX (Tosoh Corporation). "E-AX" indicates a product name of an epoxy-based curing agent (Soken Chemical & Engineering Co., Ltd.). "TD-75" indicates a product name of an isocyanate-based curing agent (Soken Chemical & Engineering Co., Ltd.).

"UV-3310B" and "UV-1700" represent a product name of urethane acrylate (The Nippon Synthetic Chemical Industry Co., Ltd.). Physical properties of UV-3310B are the viscosity at 60° C.: 40,000 to 70,000 mPa·s, weight average molecular weight Mw: 5,000, oligomer functional group number: 2, and glass transition temperature Tg: 22° C.

"Perhaxa (registered trademark) V" is a thermopolymerization initiator containing n-butyl 4,4-bis(t-butylperoxy) valerate as an active component. "Perocta (registered trademark) O" is a thermopolymerization initiator containing 1,1,3,3-tetramethylbutyl peroxy-2-ethylhexanoate as an active component. "Perbutyl (registered trademark) O" is a thermopolymerization initiator containing t-butyl peroxy-2-ethylhexanoate as an active component. "Perhexa (registered trademark) HC" is a thermopolymerization initiator containing 1,1-bis(t-hexylperoxy) cyclohexane as an active component. "Perhexyl (registered trademark) Z" is a thermopolymerization initiator containing t-hexyl peroxybenzoate as an active component. "Irg651" is a photopolymerization initiator containing 2,2-dimethoxy-2-phenylacetophenone (another name benzyl dimethyl ketal) as an active component. "Percumyl (registered trademark)

ND" is a thermopolymerization initiator containing, as an active component, cumyl peroxyneodecanoate having a low 1-minute half-life temperature (about 94° C.). "Percumyl (registered trademark) P" is a thermopolymerization initiator containing, as an active component, diisopropylbenzene hydroperoxide having a very high 1-minute half-life temperature (about 232° C.). When a thermal pressing temperature is set at 210° C. or lower, and a thermopolymerization initiator having a 1-minute half-life temperature higher than the thermal pressing temperature is used, since there is a possibility that a part of a thermal reaction initiator remains unreacted, and this becomes the cause for expansion in a durability test or the like, this is not preferable.

(Test Results)

Then, evaluation methods and results thereof will be illustrated.

(DSC Measuring Method)

By differential scanning calorimetry (DSC) at a temperature raising rate of 10° C./min, a heat generation starting temperature and a peak temperature of the adhesive resin layer were measured. The peak temperature is a measured value of a temperature of an exothermic peak (peak at which heat generation quantity becomes maximum). The heat generation starting temperature is a measured value of a temperature when an exothermic peak is raised from a baseline, at which a peak temperature becomes lowest. A measurement range is at least 20° C. to 210° C., and in the case where an exothermic peak is not confirmed within that range, when the adhesive resin layer does not contain the thermopolymerization initiator, it is expressed by "none", and when the adhesive resin layer contains the thermopolymerization initiator, it is expressed by "not observed".

(Method of Evaluating Adhesive Resin Layer by Multidimensional Shape Preparation)

As a substrate, two flat polyethylene terephthalate (PET) films having a thickness of 100 μm, which had been cut into 15 cm×15 cm, were prepared. Thicknesses of them may be the same or different, and the same thickness was adopted in this evaluation method. A separator on one side was released from the adhesive resin film, the film was adhered to a first PET film, a separator on a reverse side was further released, and a second PET film was adhered thereto, to prepare a laminated film in which the adhesive resin layer is held by two PET films Up to this is defined as a lamination step.

Using a die by which a multidimensional shape can be formed, the laminated film was arranged between upper and lower dies, and a temperature of the dies was raised to a preset temperature. The preset temperature (150° C. in Example 9; 200° C. in Examples 1 to 8 and 12 to 19; 250° C. in Example 10; and 300° C. in Example 11) is defined as a thermal pressing temperature, and the state before a temperature reaches the thermal pressing temperature is defined as pre-heating. At the time point at which a temperature was raised to the thermal pressing temperature, upper and lower dies were pressed to deform the laminated film. The time during which upper and lower dies are joined was defined as a pressing time, and this was set at 2 minutes in the present evaluation method. After 2 minutes passed, the dies were opened, and the laminated film was taken out.

Concerning a multidimensional shaped laminated film and its preparation process, four items of lamination step inconvenience, edge floating, adhesion strength, and fine followability were evaluated at four levels of ⊙ (very excellent), ○ (excellent), Δ (slightly excellent), and x (inferior).

Lamination step inconvenience was evaluated by the presence or absence, a degree and the like of deteriorated adhesion in a lamination step before thermal pressing, as follows.

⊙: Air bubbles and a defect were not visually observed in a laminated film, and appearance was good.

○: Air bubbles or a defect were visually observed slightly in a laminated film, but appearance was at the level of no problem for practical use.

Δ: Air bubbles or a defect were visually observed slightly in a laminated film, but were within the acceptable range.

x: Air bubbles or a defect were visually observed in a laminated film, and appearance was without the acceptable range.

Regarding edge floating, visual appearance confirmation was performed concerning a laminated film after thermal pressing, and evaluation was performed as follows.

⊙: Edge floating cannot be confirmed in a laminated film.

○: Edge floating can be confirmed extremely slightly in a laminated film.

Δ: Edge floating can be confirmed in a laminated film, but is within the acceptable range.

x: Edge floating can be confirmed in a laminated film, and is outside the acceptable range.

Regarding the adhesion strength, the adhesion strength between two PET films was measured concerning a measurement sample prepared from a laminated film after thermal pressing, and evaluated as follows. Using a peel testing machine of Shimadzu Corporation, one of the two PET films was peeled, it was peeled at a peeling angle of 180 degrees and a tensile rate of 300 m/min over a length of 100 mm, and an average value of a portion in which a numerical value is stable was defined as adhesion strength. From this measured value, evaluation was performed as follows.

⊙: The adhesion strength is 30 N/25 mm or more.

○: The adhesion strength is 20 N/25 mm or more and less than 30 N/25 mm.

Δ: The adhesion strength is 10 N/25 mm or more and less than 20 N/25 mm.

x: The adhesion strength is less than 10 N/25 mm.

Additionally, appearance was visually confirmed concerning a laminated film after thermal pressing, whether there is expansion of air bubbles or the like or not was confirmed, and fine followability was evaluated as follows.

⊙: Air bubbles cannot be confirmed in a laminated film.

○: Air bubbles can be confirmed extremely slightly in a laminated film.

Δ: Air bubbles can be confirmed in a laminated film, but this is within the acceptable range.

x: Air bubbles can be confirmed in a laminated film, and this is outside the acceptable range.

Results by the above-mentioned evaluation method are shown in the following Table 2.

TABLE 2

| | Thickness of adhesive resin layer/μm | DSC measurement | | Evaluation results | | | |
|---|---|---|---|---|---|---|---|
| | | Heat generation starting temperature/° C. | Peak temperature/° C. | Lamination step inconvenience | Edge floating | Adhesion strength | Fine followability |
| Example 1 | 50 | 111 | 137 | ⊙ | ○ | ○ | ⊙ |
| Example 2 | 50 | 110 | 138 | ⊙ | ○ | ○ | ⊙ |
| Example 3 | 50 | 105 | 141 | ⊙ | ○ | Δ | ⊙ |
| Example 4 | 50 | 110 | 142 | ⊙ | ○ | ○ | ⊙ |
| Example 5 | 50 | 112 | 141 | Δ | Δ | Δ | ⊙ |
| Example 6 | 50 | 85 | 129 | ⊙ | ○ | ○ | ⊙ |
| Example 7 | 50 | 82 | 133 | ⊙ | ○ | ○ | ⊙ |
| Example 8 | 50 | 85 | 134 | ⊙ | ○ | Δ | ⊙ |
| Example 9 | 50 | 82 | 142 | ⊙ | ○ | ○ | ⊙ |
| Example 10 | 50 | 145 | 192 | ⊙ | ⊙ | ○ | ○ |
| Example 11 | 50 | 155 | 203 | ⊙ | ⊙ | ○ | ○ |
| Example 12 | 50 | 131 | 173 | ⊙ | ⊙ | ○ | ○ |
| Example 13 | 50 | 122 | 160 | ⊙ | ⊙ | ○ | ○ |
| Example 14 | 50 | 124 | 127 | ⊙ | ⊙ | ○ | ○ |
| Example 15 | 50 | 110 | 127 | ⊙ | ⊙ | ⊙ | ○ |
| Example 16 | 50 | 116 | 134 | ⊙ | ⊙ | ⊙ | ○ |
| Example 17 | 50 | 120 | 137 | ⊙ | ⊙ | ⊙ | ○ |
| Example 18 | 50 | 128 | 152 | ⊙ | ⊙ | ⊙ | ○ |
| Example 19 | 50 | 109 | 145 | ⊙ | ⊙ | ⊙ | ○ |
| Comparative Example 1 | 50 | None | None | X | X: Peeling after thermal pressing | | |
| Comparative Example 2 | 50 | None | None | ⊙ | X: Expansion during pre-heating | | |
| Comparative Example 3 | 50 | None | None | ⊙ | X: Expansion during pre-heating | | |
| Comparative Example 4 | 50 | 58 | 95 | ⊙ | X: Expansion during pre-heating | | |
| Comparative Example 5 | 50 | 108 | 139 | X | X: Expansion after thermal pressing | | |
| Comparative Example 6 | 50 | 78 | 115 | ⊙ | X: Expansion during pre-heating | | |
| Comparative Example 7 | 50 | None | None | ⊙ | X: Expansion during pre-heating | | |
| Comparative Example 8 | 50 | Not observed | Not observed | ⊙ | X: Expansion during pre-heating | | |

(Evaluation Results)

In the Examples, inconvenience of appearance such as air bubbles could not be confirmed in a laminate in all cases. This may be because the adhesive resin composition contains, as a highly flowable component, the (B) acrylic-based monomer or acrylic-based oligomer, in addition to the (A) acrylic-based polymer.

In Comparative Examples 1 and 5, by confirmation of appearance after thermal pressing, peeling was confirmed between the adhesive resin layer and the PET film, at a portion at which the substrate was deformed. This may be because a flowable resin component having reactivity (acrylic-based monomer or acrylic-based oligomer) is not contained in the adhesive resin composition, and the adhesive resin layer does not follow deformation of a material.

In Comparative Examples 2 to 4 and 6 to 8, by confirmation of appearance after thermal pressing, a portion at which the substrate was deformed, followed thereto well, but expansion was confirmed on the whole surface.

In Comparative Example 2, it is considered that the flowable resin component having reactivity is contained in the adhesive resin composition, but since the initiator is a photopolymerization initiator, a curing reaction did not progress during thermal pressing, and a part of low-molecular components were vaporized, and peeling occurred by volatilization and reduction in adherability due to a temperature, at release of the pressure from the die. In the case of this example, if ultraviolet irradiation is performed by any method during thermal pressing, and a curing reaction can be made to progress, this problem is solved, but it is difficult to irradiate an ultraviolet ray into an opaque die.

In Comparative Examples 3 and 7, it is considered that the flowable resin component having reactivity is contained in the adhesive resin composition, but since the initiator is not contained, a curing reaction did not progress at thermal pressing, and peeling occurred based on the same reason as that of Comparative Example 2.

In Comparative Example 4, it is considered that, by using a peroxide having a low 1-minute half-life temperature as the initiator, a heat generation starting temperature was too low for a curing reaction during thermal pressing to progress, and peeling occurred based on the same reason as that of Comparative Example 2.

In Comparative Example 8, it is considered that, by using a peroxide having a high 1-minute half-life temperature as the initiator, a peak could not be observed at 210° C. or lower in measurement by DSC, a polymerization reaction was not initiated at a temperature at the time of thermal pressing, and peeling occurred based on the same reason as that of Comparative Example 2.

In Comparative Example 6, it is considered that since an amount of the thermopolymerization initiator relative to the flowable resin component having reactivity is too large, a heat generation starting temperature and a peak temperature in measured values by DSC are low, a polymerization reaction progresses from before thermal pressing, and even when a reaction is performed, a molecular weight of a polymer does not become large, and adherability is not improved, and accordingly, expansion occurs.

From results of Comparative Examples 1 to 3, 5, and 7, it is seen that in order to manifest the function of the Examples, it is essential that the flowable resin component having reactivity and the thermopolymerization initiator are added into the adhesive resin composition. Additionally, from results of Comparative Examples 4, 6, and 8, it is seen that in order to manifest the function of the Examples, when a peak temperature by DSC measurement of the adhesive resin layer is not only too low, but also too high, there is a problem. In addition, a peak temperature can be controlled by adjusting a kind of the thermopolymerization initiator, an amount of the thermopolymerization initiator relative to the acrylic-based polymer or the flowable resin component, or the like.

In the Examples, since the adhesive resin layer is adhered to a substrate which was adhered with PET or the like in the state where flowability is high, they can be firmly attached closely. Further, it is considered that since after the flowable resin component having reactivity is flown by thermal pressing, and follows deformation of the substrate, a thermopolymerization reaction gradually progresses by heat, the flowable resin component having reactivity is polymerized to reduce flowability of the adhesive resin layer, and the layer is cured in the deformed state, not only air bubbles at a deformed portion were not generated, but also expansion between the substrates was not generated.

Addition of 4HBA having good compatibility with the acrylic-based oligomer as in Example 19 has the effect of securing stability of a paint. Since there is a tendency that as a molecular weight of the acrylic-based polymer is larger, heat resistance and durability become better, it is preferable to use a polymer having a molecular weight which was increased as much as possible. By addition of the flowable resin component having reactivity, there was a tendency that the leveling property of the adhesive resin layer at formation of a film is good, and uniformity of a film thickness is improved.

When after the adhesive resin film of each example was thermally pressed under the same condition as that of "Method of Evaluating Adhesive Resin Layer by Multidimensional Shape Preparation" while the adhesive resin layer was laminated between separators, the cured adhesive resin layer was analyzed by FT-IR (Fourier transform infrared spectroscopy), peaks of a carbon-carbon double bond (vinyl group of acrylic-based monomer and the like) could be confirmed slightly. When analysis was further performed by DSC (differential scanning calorimetry) before and after thermal pressing, an exothermic peak was observed in DSC measurement before thermal pressing, but an exothermic peak was not observed in DSC measurement before thermal pressing. From these results, it is considered that a curing reaction was completed under the thermal pressing condition.

In the adhesive resin layers of Comparative Examples 1 to 5 and 7 to 8, even when thermal pressing was performed, a few peaks which seem to derive from a carbon-carbon double bond were confirmed by FT-IR.

In DSC before thermal pressing of Comparative Examples 1 to 3 and 7, an exothermic peak was not confirmed. Since a reaction due to heat cannot be confirmed, it can be determined that a thermal curing reaction has not progressed.

In DSC before thermal pressing of Comparative Example 5, since heat generation of the thermopolymerization initiator is only confirmed, and there is no flowable resin component having reactivity, a polymerization reaction does not progress.

In DSC before thermal pressing of Comparative Examples 4 and 8, an exothermic peak was confirmed, but since a heat generation starting temperature and a peak temperature are high, it can be determined that a thermal curing reaction did not progress under the above-mentioned thermal pressing condition.

In the adhesive resin layer of Comparative Example 6, peaks of a carbon-carbon double bond could be confirmed slightly by FT-IR after thermal pressing. Furthermore, an exothermic peak was observed in DSC measurement before thermal pressing, but an exothermic peak was not observed in DSC measurement after thermal pressing. From these results, it is considered that in Comparative Example 6, a curing reaction was completed under the thermal pressing condition.

(DSC Measurement of Adhesive Resin Itself)

In Examples 15 to 18, thermal analysis of the adhesive resin itself was performed by DSC. From this result, it was confirmed that a reaction rapidly starts at 100° C. or higher, depending on a kind of the thermopolymerization initiator. From this, it is seen that a boiling point of the organic solvent which can be used in the adhesive raw material composition and the adhesive resin composition is preferably 100° C. or lower, and more preferably 80° C. or lower.

From the above results, by inclusion of the (A) acrylic-based polymer, the (B) acrylic-based monomer or acrylic-based oligomer, and the (C) thermopolymerization initiator which are a main component, in the adhesive resin layer, there can be prepared a pressure sensitive adhesive film which suppresses air bubbles and peeling due to thermal pressing at a high temperature, and becomes to be able to form a three-dimensional shape.

What is claimed is:

1. A monolayered adhesive resin layer comprising an acrylic-based adhesive resin composition, wherein
    said adhesive resin composition consists essentially of (A) a crosslinked acrylic-based polymer, (B) an acrylic-based monomer or an acrylic-based oligomer as a flowable resin component having reactivity, (C) a thermopolymerization initiator, and (D) a crosslinking agent, wherein
    said adhesive resin composition contains 0.001 to 0.5 parts by weight of said (C) thermopolymerization initiator, based on 100 parts by weight of said (A) acrylic-based polymer, and
    said adhesive resin layer has pressure sensitive adhesiveness on both surfaces at an ambient temperature, and in differential scanning calorimetry (DSC) at a temperature raising rate of 10° C./min, heat generation is observed at 80° C. or higher, and at least one peak is confirmed between 120° C. and 210° C.

2. The adhesive resin layer according to claim 1, wherein said (C) thermopolymerization initiator is a peroxide.

3. The adhesive resin layer according to claim 1, wherein said adhesive resin composition contains 5 to 50 parts by weight of said (B) acrylic-based monomer or acrylic-based oligomer, based on 100 parts by weight of said (A) acrylic-based polymer.

4. The adhesive resin layer according to claim 1, wherein said adhesive resin composition contains an acrylic-based monomer having a hydroxy group, as at least a part of said (B) acrylic-based monomer or acrylic-based oligomer.

5. The adhesive resin layer according to claim 1, wherein said adhesive resin composition contains curable urethane acrylate, as at least a part of said (B) acrylic-based monomer or acrylic-based oligomer.

6. An adhesive resin film comprising the adhesive resin layer according to claim 1 laminated between two separators.

7. An adhesive resin layer for forming a laminate in which two substrates are laminated with the adhesive resin layer according to claim 1 interposed between the two substrates.

8. An adhesive resin layer, wherein a laminate obtained by laminating two substrates with the adhesive resin layer according to claim 1 interposed between the two substrates is subjected to thermal deformation in a state where said laminate is held between two dies, and said adhesive resin layer has a pressure sensitive adhesive force of 10 N/25 mm or more even after being thermally cured.

* * * * *